United States Patent [19]

Satek et al.

[11] Patent Number: 5,108,973
[45] Date of Patent: Apr. 28, 1992

[54] CRYSTALLINE COPPER CHROMIUM ALUMINUM BORATE

[75] Inventors: Larry C. Satek; Patrick E. McMahon, both of Wheaton, Ill.

[73] Assignee: Amoco Corporation, Chicago, Ill.

[21] Appl. No.: 705,742

[22] Filed: May 28, 1991

[51] Int. Cl.$^5$ .................. B01J 21/02; B01J 23/26; B01J 23/72
[52] U.S. Cl. .................................... 502/204
[58] Field of Search ............... 502/204, 206; 423/279, 423/297

[56] References Cited

U.S. PATENT DOCUMENTS

| | | | |
|---|---|---|---|
| 3,883,442 | 5/1975 | McArthur | 502/204 |
| 4,590,324 | 5/1986 | Satek | 585/444 |
| 4,645,753 | 2/1987 | Zletz et al. | 502/204 X |
| 4,729,979 | 3/1988 | Zletz | 502/204 X |
| 4,913,886 | 4/1990 | Satek | 423/279 X |

*Primary Examiner*—W. J. Shine
*Assistant Examiner*—Douglas J. McGinty
*Attorney, Agent, or Firm*—Frederick S. Jerome; William H. Magidson; Ralph C. Medhurst

[57] ABSTRACT

The preparation, structure, and properties of solid inorganic materials containing at least copper, chromium, aluminum, boron and oxygen which new materials have a characteristic X-ray diffraction pattern are described. Also described is the use of such materials in catalytic compositions for the conversion of organic compounds. In particular, new compositions comprising material having a structure $$Cu_{2-x}Cr_yAl_{6-y}B_4O_{17}M_mM'_n$$

where M is a divalent metal, M' is a monovalent metal, m is a number in a range from 0 to 0.8, n is a number in a range from 0 to 1.6, X is a number in a range from 0 to 0.8 and is equal to the sum of m and n/2, and y is a number in a range from 0.01 to 3, having a characteristic X-ray diffraction pattern are described as well as the use of such materials in various catalyzed processes including dehydrogenation of hydrocarbons and oxygen-containing hydrocarbons.

17 Claims, No Drawings

CRYSTALLINE COPPER CHROMIUM ALUMINUM BORATE

BACKGROUND OF THE INVENTION

The present invention relates to crystalline inorganic materials containing at least copper, chromium, aluminum, boron and oxygen. In particular, new compositions comprising material having a formula $$Cu_{2-x}Cr_yAl_{6-y}B_4O_{17}M_mM'_n$$

where M is a divalent metal, M' is a monovalent metal, m is a number in a range from 0 to 0.8, n is a number in a range from 0 to 1.6, X is a number in a range from 0 to 0.8 and is equal to the sum of m and n/2, and y is a number in a range from 0.01 to 3, having a characteristic X-ray diffraction pattern are described as well as the use of such materials in various catalyzed processes including dehydrogenation of hydrocarbons and oxygen-containing hydrocarbons, and dehydrogenation to functionalize alkyl-aromatic compounds.

The use of active metallo elements and/or supported metallo element compositions containing aluminum and boron as a conversion catalyst is known in the art. U. S. Pat. No. 3,883,442 to McArthur is illustrative of prior art disclosing the superiority of a supported active metal catalyst to resist shrinkage at high temperatures (up to 1600° C.) by stabilization of a preformed alumina catalyst support. McArthur states stabilization was achieved by impregnating an alumina support with a solution of a boron compound which is thermally decomposable to $B_2O_3$, followed by drying and calcining of the impregnated support at temperatures below about 1500° C., but sufficiently high to decompose the boron compound McArthur also discloses that the most commonly used technique of preparing a supported metallo element catalyst involved, following calcination, impregnating in conventional manner the alumina support material containing some retained $B_2O_3$ with a solution of the desired metal salt, preferably those that are thermally decomposable to give the corresponding metal oxides and/or sulfides, and calcining the salt-impregnated support to convert the impregnated salt to the active catalytic form. McArthur neither discloses nor suggests any crystalline copper aluminum borate composition.

Zletz in U.S. Pat. No. 4,729,979, which is hereby incorporated by reference, discusses the characteristics of a good catalyst and/or catalyst support and a new crystalline copper aluminum borate characterized by a specific X-ray diffraction pattern, surface area and pore volume which is at least partially reducible with hydrogen at a temperature no more than 350° C. to a composition containing zero valent copper and $Al_4B_2O_9$. Satek in U.S. Pat. No. 4,590,324, which is hereby incorporated by reference, discusses using the new crystalline copper aluminum borate as a catalyst to dehydrogenate alkylaromatics to alkenylaromatics. Zletz et al. in U.S. Pat. No. 4,645,753, which is hereby incorporated by reference, discusses doping the new crystalline copper aluminum borate to contain an alkali metal or alkaline earth metal element for use as a catalyst to dehydrogenate alkylaromatics to alkenylaromatics. The Zletz, Satek, and Zletz et al. patents alone or in combination neither disclose nor suggest a mixed oxide composition of copper aluminum, boron, and chromium having a characteristic pattern of significant X-ray diffraction lines.

In particular, U.S. Pat. No. 4,729,979 discloses that attempts to obtain a crystalline copper aluminum borate in which a part of the aluminum would be replaced with an additional element, including chromium, were made in preparations of copper aluminum borate in which a part of the aluminum component can be replaced with trivalent metal salts including chromic acetate, ferrous or ferric acetate, etc. The patent states; "however, chromium forms a chromite and appears not replace aluminum" (U.S Pat. No. 4,729,979, column 6, lines 39 and 40). This teaching not withstanding, the present invention is directed to copper chromium aluminum borates, i.e. particular new crystalline copper aluminum borates in which a portion of the aluminum is advantageously replaced with chromium The general object of the present invention is to provide new crystalline materials having chemical and physical characteristics that make them useful catalytically. Another general object of this invention is to produce a new solid material which is useful in various catalyzed processes including dehydrogenation of hydrocarbons and oxygen-containing hydrocarbons, and alkylaromatic compounds, and in dealkylation of alkyaromatic compounds. Other objects and advantages of the invention will become apparent upon reading the following detailed description and appended claims.

SUMMARY OF THE INVENTION

In one aspect, the present invention is an inorganic crystalline material comprising copper, chromium, aluminum, boron, and oxygen having an X-ray diffraction pattern comprising significant lines substantially as described in Table I. Advantageously, these materials are admixed with various binders depending upon the intended process use. As indicated below, the catalyst of this invention can be used for conversion of alcohols to useful organic compounds, such as aldehydes and/or ketones (this is the subject of commonly assigned application Serial No. 20044 filed in the name of McMahon et al., which is hereby incorporated by reference). In another aspect, the invention describes the preparation and properties of a crystalline inorganic material comprising copper, chromium, aluminum, boron, and oxygen, made by calcining a mixture containing sources of copper ions, chromium ions, alumina, and boria at elevated temperature, the material providing an X-ray pattern comprising lines substantially as shown in Table I.

In a preferred embodiment, the present invention is an inorganic material having a formula $$Cu_{2-x}Cr_yAl_{6-y}B_4O_{17}M_mM'_n$$

where M is a divalent metal, M' is a monovalent metal, m is a number in a range from 0 to 0.8, preferably 0.01 to 0.4, n is a number in a range from 0 to 1.6, preferably 0.01 to 1, X is a number in a range from 0 to 0.8, preferably 0.01 to 0.5, and is equal to the sum of m and n/2, and y is a number in a range from 0.01 to 3, preferably 0.015 to 2, and having a characteristic X-ray diffraction pattern comprising significant lines and assigned strengths substantially as shown in Table I.

In another aspect, the invention describes an inorganic crystalline material comprising copper, chromium, aluminum, boron, and oxygen having an X-ray diffraction pattern comprising significant lines substantially as described in Table I, and having a formula $$Cu_{2-x}Cr_yAl_{6-y}B_4O_{17}M_x$$

where M is a divalent metal selected from the group consisting of zinc, cobalt, and nickel, X is a number in a range from 0 to 0.8, preferably 0.01 to 0.5, and y is a number in a range from 0.01 to 3, preferably 0.015 to 2,.

In still another aspect, the invention describes an inorganic crystalline material comprising copper, chromium, aluminum, boron, and oxygen having an X-ray diffraction pattern comprising significant lines substantially as described in Table I, and having a formula $$Cu_2Cr_yAl_{6-y}B_4O_{17}$$

where y is a number in a range from 0.01 to 3, preferably 0.015 to 2.

TABLE I

| Principal XRD Lines | |
|---|---|
| Interplanar Spacing d,[1] Å | Assigned Strength |
| 5.29 ± .05 | Very Strong |
| 5.00 ± .05 | Strong |
| 3.73 ± .03 | Weak-Medium |
| 2.64 ± .03 | Medium Strong |
| 2.61 ± .02 | Weak-Medium |
| 2.50 ± .02 | Weak-Medium |
| 2.26 ± .02 | Weak-Medium |
| 2.16 ± .02 | Medium |
| 2.07 ± .02 | Medium |
| 1.97 ± .02 | Medium |
| 1.86 ± .01 | Weak-Medium |
| 1.81 ± .01 | Medium |

[1]Angstroms

As is generally known, the assigned strengths in X-ray diffraction patterns may vary depending upon the characteristics of the sample. The observed line strength in any particular sample may vary from another sample, for example, depending upon the amount of each crystalline phase and/or amorphous material in a sample. Also, X-ray diffraction lines of a particular crystalline material may be obscured by lines from other materials present in a measured sample.

DETAILED DESCRIPTION OF THE INVENTION

The copper, chromium, aluminum, boron, and oxygen solid materials of the present invention can be prepared by calcining a mixture of a source of copper(II) ions, a source of chromium(III) ions, a source of alumina, and a source of boria.

Conditions of calcination include a temperature within the range of about 600° C. to about 1500° C., and a reaction time that is sufficient to effect formation of a crystalline copper chromium aluminum borate. Calcination may be carried out under vacuum, but a pressure of at least about one atmosphere is generally more suitable Increasing pressure and temperature of calcination, generally affect formation of a crystalline copper chromium aluminum borate in a shorter reaction time. Higher temperatures of calcination typically results in crystalline materials with less desirably surface properties, for example low surface area. Preferred calcination temperatures are in a range of about 700° C. to 1100° C. Calcination can be carried out in air, nitrogen or other inert gases. A preferred atmosphere for calcination contains oxygen.

The solid materials of this invention can be prepared generally by dispersing the required ingredients in a liquid medium, preferably an aqueous or aqueous/organic medium which is converted to a gel, removing substantially all the liquid to form superficially dry mixture, and calcining the dry mixture.

When a liquid medium is used, the source of chromium(III) ions can be a sol or any reasonably soluble salt of chromium(III) ions, or precursor thereof which is at least partially soluble in the dispersing liquid, such as the acetate, formate, nitrate, carbonate, chloride, bromide, sulfate and the like. Salts of chromium containing a decomposable anion such as chromium nitrate, chromium acetate, chromium formate, chromium carbonate, chromium alkoxide, etc. are preferred. When the source of chromium is a sol, oxides are preferred.

Typically, best results are obtained when each of the sources used is chosen to reduce the content of foreign anions and cations in the reaction mix. In order to avoid the introduction of any extraneous ions into the crystalline copper chromium aluminum borate, it is generally desirable to avoid the presence of cations or anions that are not destroyed and/or volatilized during the subsequent drying and/or calcination step. The presence of volatile components in preparation of copper chromium aluminum borate, such as water, ammonia, acetate ion, nitrate ion, etc. is advantageous in providing the copper chromium aluminum borate with relatively high surface area and porosity desirable for most catalytic reactions.

Accordingly, sources of copper for use in this invention include copper nitrate, copper acetate, copper carbonate, copper borate, etc. since the nitrate, acetate or carbonate anions are destroyed during the drying or calcination step.

The source of alumina is any material capable of producing alumina, but preferred is a well dispersed, liquid source such as an alumina sol.

The source of boria is a material such as borate, boron oxide, or boric acid with pure boric acid being preferred.

Typically, the mole ratios of the various reactants can be varied to produce the solid of this invention. Specifically, the mole ratios in terms of oxides of the initial reactant concentrations are characterized by the general mixed oxide formula $$(u)CuO \cdot (v)Cr_2O_3 \cdot (w)Al_2O_3 \cdot (k)B_2O_3$$

where u, v, w, and k are numbers representing molar amounts of the oxides of the source reagents The mole ratios of $CuO/B_2O_3$, calculated as u/k, are about 0.2 to about 5, preferably about 0.5 to about 2, and most preferably about 0.67 to about 1.5, the mole ratios of $(Cr_2O_3 + Al_2O_3)/B_2O_3$, calculated as (v+w)/k, are about 0.3 to about 20, preferably about 0.5 to about 6, and most preferably about 1 to about 3, and the mole ratios of $Al_2O_3/(Cr_2O_3 + Al_2O_3)$, calculated as w/(v+w), are from about 0.3 to about 20, preferably about 0.5 to about 6, and more preferably about 1 to about 3.

In somewhat greater detail, a preferred procedure is to dissolve the boria source and disperse the alumina source in water with mixing in a blender for about 3-5 minutes, then add an aqueous sol or solution of a source of a copper and an aqueous sol or solution of a source of chromium to the blender followed by gelation with a chemical base such as ammonia or tetramethylamonium hydroxide.

Typically, the pH of the aqueous mixture is less than about 11. If the reaction media is too acid or too basic, the desired solid generally will not form or other contaminating phases are formed in addition to the desired product. To some extent the pH of the reaction mixture controls surface properties of the final calcined solid material. Preferably, the pH of the reaction mixture is in a range from about 2 to about 10, more preferably about 3 to about 9, in order to gel the reaction mixture If desired, the pH can be adjusted with a base such as ammonia, ethylenediamine, tetramethylamonium hydroxide and the like. Preferred is the use of ammonium hydroxide. The presence of the ammonia as well as other volatile components in the gelled mixture, such as acetate ion, nitrate ion, etc., is advantageous in providing the final calcined solid with sufficiently high surface area and porosity desirable for catalytic reactions.

The gelled mixture is allowed to air-dry, usually for about 1-3 days, followed by vacuum drying, typically at a pressure of about 0.3 atmosphere for about 15 to 25 hours at about 100° C. to 150° C. with a purge of dry gas, such as nitrogen.

The superficially dry mixture is calcined, preferably at a temperature within the range of about 700° C. to about 1000° C. for a reaction time that is sufficient to effect formation of a crystalline metalloaluminum borate, typically a reaction time within the range of about 2 to about 30 hr. Samples of material can be removed during calcination to check the degree of crystallization and determine the optimum calcination time.

The crystalline material formed can be crushed to a powder or to small particles and extruded, pelletized, or made into other forms suitable for its intended use. In a preferred embodiment of the above-described method, the crystalline material formed can be washed with a solvent, preferably an aqueous solvent, which removes impurities such as excess boria, without destroying the crystalline material formed, mildly dried for anywhere from a few hours to a few days at varying temperatures, typically about 50° C. to about 225° C., to form a dry cake which can then be treated as required for its intended use.

The solid materials made by this invention can be admixed with or incorporated within various binders or matrix materials depending upon the intended process use. They are combined with active or inactive materials, synthetic or naturally occurring oxides, as well as inorganic or organic materials which would be useful for binding such substances. Well-known materials include silica, silica-alumina, alumina, magnesia, titania, zirconia, alumina sols, hydrated aluminas, clays such as bentonite or kaolin, Sterotex (a powdered vegetable stearine produced by Capital City Products, Co., Columbus, OH), or other binders well known in the art.

Advantageously, a crystalline copper chromium aluminum borate for use according to this invention is formed or combined with from about 0.05 to about 50 wt% of at least one compound of a metallo element based on the weight of crystalline material.

A suitable metallo dopant is selected from the group consisting of alkali metal, alkaline earth metal, low melting metal, brittle metal, and heavy metal compounds which include their oxides, hydroxides and salts of lithium, sodium, potassium, rubidium, cesium, magnesium, calcium, strontium, barium, chromium, zinc, cadmium, lanthanum, cerium, palladium, platinum, and thorium. Suitable compounds include lithium hydroxide, sodium hydroxide, potassium hydroxide, magnesium hydroxide, potassium oxide, sodium oxide, potassium carbonate, sodium carbonate, sodium bicarbonate, potassium nitrate, potassium borate, sodium borate, potassium chloride, potassium acetate, sodium propionate, potassium maleate, etc. Of these, potassium and palladium, in the form of the oxide or in a form readily convertible to the oxide, are preferred. The solid materials formed according to this invention can be treated with from about 0.05 to 50 wt% dopant based on the weight of the solid material. The metallo compound or compounds can be dry-blended with the copper chromium aluminum borate, dissolved in a suitable solvent, preferably water, mixed with the solid material and dried; or aqueous solutions of same can be added to feedstocks going to a reactor containing the solid material catalyst.

Catalyst compositions of this invention are useful generally in the chemical conversion of organic compounds, particularly hydrocarbon and oxygenated hydrocarbon. In particular, it is useful for chemical conversion reactions such as oxidation, dehydration, dehydrogenation, and oxidative dehydrogenation. Crystalline materials of this invention have been used for oxidation of ethanol to acetaldehyde, for dehydrogenation of cumene to alpha-methylstyrene, and for dehydrogenation of n-propanol to propionaldehyde, isopropyl alcohol to acetone, cyclohexanol to cyclohexanone.

Particularly useful is the fact that when these solid catalyst compositions are used in liquid and/or gas phase processes, the products of chemical conversion are easily separated from the solid catalyst material. Also useful is the fact that when these solid catalyst compositions are used in such fluid-phase processes, the active metallo element components are only slowly extracted, leading to longer catalyst lifetime.

The following examples will serve to illustrate certain specific embodiments of the herein disclosed invention. These examples should not, however, be construed as limiting the scope of the novel invention, as there are many variations which may be made thereon without departing from the spirit of the disclosed invention, as those of skill in the art will recognize.

EXAMPLES

General

Temperatures are in degrees Celsius.
Percents are weight percents.

EXAMPLE 1

In this example about 25 molar percent of the aluminum oxide is replaced by chromium oxide. Specifically, the copper chromium aluminum borate is characterized by the formula $$Cu_2Cr_{1.25}Al_{4.5}B_4O_{17}$$

This crystalline copper chromium aluminum borate was prepared as follows: PHF alumina sol (763.8 g of a 7.51% $Al_2O_3$ sol, 0.562 mol) was added to a 1 gal blender. Chromium nitrate hexahydrate (89.3 g, 0.375 mol), without any additional water, was added to the blender and blended until dissolved. Copper nitrate hexahydrate (116.3 g, 0.50 ml) was dissolved in 200 mL warm deionized water and added to the blender. Boric Acid (61.8 g, 1.00 mol) was dissolved in 350 mL warm deionized water and also added to the blender. The mixture was blended for an additional two minutes until the thin mixture was homogeneous and deep blue. The pH of the mixture at this point was 1.94. Then 700 mL of a 20% ammonium hydroxide in methanol solution was added while blending, to give a thick gel having a final pH of 7. The gel was placed on 35×45 cm plastic trays for drying. The material was vacuum dried (0.3 atm., nitrogen flow) for 4 hours at 180° C. At this temperature, the sample appeared to be overheating, and the nitrogen flow was turned up and the heat turned off. A 40 g portion of the material was calcined with the following program.

$$25° C. \xrightarrow{2 \text{ hr}} 175° C. \xrightarrow{12 \text{ hr}} 400° C. \xrightarrow{4 \text{ hr}}$$

$$830° C. \xrightarrow{8 \text{ hr}} 830° C. \xrightarrow{4 \text{ hr}} 250° C. \longrightarrow RT$$

The surface area was determined to be 5 m$^2$/g. The material was analyzed by ICP and found to contain 8.0% Cr, 21.5% Al, 21.6% Cu and 6.6% B. The XRD powder pattern shows that the material is highly crystalline with only the copper aluminum borate XRD powder pattern observed. The powder X-ray diffraction lines of this crystalline copper chromium aluminum borate are set out below:

| Interplanar Spacing d,[1] Å | Assigned Strength[2] | Relative Intensity |
|---|---|---|
| 7.051 | M | 23 |
| 5.31 | VS | 100 |
| 5.03 | S | 56 |
| 3.75 | W-M | 6 |
| 3.64 | VW-W | 3 |
| 3.36 | W | 7 |
| 3.01 | VW-W | 2 |
| 2.85 | MVW-W | 4 |
| 2.65 | M-S | 33 |
| 2.62 | W-M | 10 |
| 2.51 | W-M | 10 |
| 2.27 | W-M | 15 |
| 2.17 | W-M | 12 |
| 2.08 | W-M | 12 |
| 1.99 | M | 24 |
| 1.87 | VW-W | 6 |
| 1.82 | VW-W | 8 |
| 1.77 | VW | 3 |
| 1.68 | W-M | 9 |
| 1.60 | VW-W | 3 |
| 1.57 | VW-W | 3 |

[1]Angstroms
[2]VW = very weak; W = weak; M = medium; S = strong; VS = very strong Unit cell volumes are calculated from the unit cell dimensions, which are determined from the indexed powder patterns — a normal analytical procedure for analysis of XRD powder patterns.

The material was indexed on the tetragonal cell and the cell parameters were compared to the best single crystal and powder data of pure copper aluminum borate. Standard deviations are in parentheses.

| source | a and b, Å | c, Å | volume, Å$^3$ |
|---|---|---|---|
| Example 1 | 10.6280 | 5.7158 | 645.6 |
| Cu$_2$Al$_6$B$_4$O$_{17}$ | 10.5736 | 5.6703 | 633.9 |

The nature of the unit cell volume changes upon the synthesis of solid solutions is described in standard inorganic texts such as "Structural Inorganic Chemistry" Vol. 5, A. F. Wells, Clarendon Press, Oxford, 1984, p. 1294. "For two element in the same group in our classification the range of composition over which solid solutions are formed depends on the relative sizes of the two atoms. This is to be expected, since if some of the atoms in a structure are replaced (at random) by others of a different size, distortion of the structure must occur and the cell dimensions alter as the concentration of the solute increases. To a first approximation they vary linearly with the atomic percentage of the solute (Vegard's law), though in many cases this law is not exactly obeyed."

EXAMPLE 2

In this example about 5 molar percent of the aluminum oxide is replaced by chromium oxide. Specifically, the copper chromium aluminum borate is characterized by the formula $$Cu_2Cr_{0.3}Al_{5.7}B_4O_{17}$$

This crystalline copper aluminum borate was prepared as follows: PFH alumina sol (347.5 g of a 7.51 percent Al$_2$O$_3$ sol, 0.285 mole) was added to the blender, and without any additional water, was mixed until dissolved. Copper nitrate hexahydrate (46.7 g, 0.030 mole) was dissolved in 50 mL warm deionized water and added to the blender. Boric acid (24,86 g, 0.40 mole) was dissolved in 120 mL deionized water and also added to the blender. The mixture was blended for an additional two minutes until the thin mixture was homogeneous and deep blue. The pH was 1.94. A total of 210 mL of a 20 percent ammonium hydroxide in methanol solution was added, with blending, to give a thick gel whose final Ph was 7. The gel was placed on 35 x 45 cm plastic trays for drying. The material was vacuum dried (0.3 atm., nitrogen flow, for 17 hours at 120° C.). The material was calcined with the following program.

$$25° C. \xrightarrow{2 \text{ hrs}} 175° C. \xrightarrow{12 \text{ hrs}} 400° C. \xrightarrow{4 \text{ hrs}}$$

$$830° C. \xrightarrow{8 \text{ hrs}} 830° C. \xrightarrow{4 \text{ hrs}} 250° C. \xrightarrow{2 \text{ hrs}} RT$$

The surface are was determined to be 28.8 m2/g. The XRD powder pattern shows that the material is highly crystalline with only the copper aluminum borate XRD powder pattern observed, The material was indexed on the tetragonal cell, and the cell volume is determined to be 637Å$^3$.

EXAMPLE 3

In this example about 10 molar percent of the aluminum oxide is replaced by chromium oxide. Specifically, the copper chromium aluminum borate is characterized by the formula $$Cu_2Cr_{0.6}Al_{5.4}B_4O_{17}$$

This crystalline copper aluminum borate was prepared as follows: PHF alumina sol (916.75 g of a 7.51 percent Al$_2$O$_3$ sol, 0.712 mole) was added to a 1-gallon blender. Chromium nitrate hexahydrate (23.81 g, 0.076 mole) was added to the blender, and without any additional water, was mixed until dissolved. Copper nitrate hexahydrate (116.1 g, 0.50 mole) was dissolved in 50 mL warm deionized water and added to the blender. Boric acid (61.8 g, 1.00 mole) was dissolved in 120 mL warm deionized water and also added to the blender. The mixture was blended for an additional two minutes until the thin mixture was homogeneous and blue-green. A total of 1000 mL of a 20 percent ammonium hydroxide in methanol solution was added, with blending, to give a thick gel whose final pH was 7.8. The gel was placed on 35×45 cm plastic trays for drying. The material was vacuum dried (0.3 atm., nitrogen flow, for 17 hours at 120° C.). The material was calcined with the following program:

$$25°C. \xrightarrow{2\ hrs} 175°C. \xrightarrow{12\ hrs} 400°C. \xrightarrow{4\ hrs}$$

$$830°C. \xrightarrow{8\ hrs} 830°C. \xrightarrow{4\ hrs.} RT$$

The surface area was determined to be 50.4 m2/g. A copy of the XRD powder pattern shows that the material is crystalline with only the copper aluminum borate XRD powder pattern observed. The material was indexed on the tetragonal cell and the cell volume is determined to be 639 A3. Inductively coupled plasma (ICP) analysis shows percent Al 36.0, percent Cu 12.9, percent Cr 2.46.

EXAMPLE 4

In this example about 25 molar percent of the aluminum oxide is replaced by chromium oxide, with palladium doping.

This catalyst was prepared as follows: PHF alumina sol (1528 g of a 7.51 percent $Al_2O_3$ sol, 1.125 mole) was added to a 1-gallon blender. Chromium nitrate hexahydrate (179 g, 0.759 mole) was added to the blender, and without any additional water, was mixed until dissolved. Copper nitrate hexahydrate (230.3 g, 0.99 mole) was dissolved in 250 mL warm deionized water along with palladium nitrate (2.36 g, 0.01 mole) and added to the blender. Boric acid (61.8 g, 1.00 mole) was dissolved in 120 mL warm deionized water and also added to the blender. The mixture was blended for an additional two minutes until the thin mixture was homogeneous and teal blue. A total of 18000 mL of a 20 percent ammonium hydroxide in methanol solution was added, with blending, to give a thick gel whose final pH was 6.3, The gel was placed on 35×45 cm plastic trays for drying. The material was vacuum dried (0.3 atm., nitrogen flow, for 17 hours at 120° C.). The material was calcined with the following program:

$$25°C. \xrightarrow{2\ hrs} 175°C. \xrightarrow{12\ hrs} 400°C. \xrightarrow{4\ hrs}$$

$$840°C. \xrightarrow{8\ hrs} 840°C. \xrightarrow{4\ hrs} 250°C. \longrightarrow RT$$

Inductively couple plasma (ICP) analysis shows percent Al 20.1, percent Cu 25.5, percent Cr 9.1.

A portion of the above sample, 88 g of 20/35 mesh material, was impregnated with potassium by incipient wetness using potassium carbonate. Potassium carbonate (11.4 g) was dissolved in 30 mL deionized water and added to the sieved material with an eyedropper. The sample was allowed to dry. The sample was calcined in an oven for 6 hours at 400° C.

In the following examples crystalline copper chromium aluminum borate catalysts are employed for alcohol dehydrogenation.

GENERAL ALCOHOL DEHYDROGENATION EXPERIMENTAL PROCEDURES

EXAMPLES 5 and 6

A fixed volume of catalyst was loaded into a gas phase reactor system comprising a liquid pumping system, preheat coil, metal tube heated by tube furnace, and an effluent system fitted to allow automatic sampling to an on-line gas chromatograph. Isopropyl alcohol or n-propanol were fed into the reactor such that the liquid hourly space velocity remained constant at 5.2 for each catalyst tested. The temperature of the reactor was then adjusted to achieve approximately 50% conversion for each catalyst. Samples were automatically collected and analyzed using standard GC techniques. Some catalysts were left on stream for several weeks to monitor deactivation rates.

EXAMPLE 7

Gas phase reactors fitted with regulated pumping systems, three-zone heating furnaces, fixed-bed tube reactors, and a refrigerated liquid collecting system were used for these experiments. Catalyst requirements were 40-70 grams. Liquid products were collected and analyzed by gas chromatographic/mass spectroscopic techniques.

EXAMPLE 5

| Catalyst | Hrs. | Temp. | Conv. | Product Distribution | | |
|---|---|---|---|---|---|---|
| | | | | Propene | Acetone | Condens. Products |
| Example 1 | 30 | 160 | 50.1 | 0 | 98.8 | 1.2 |
| | 100 | | 47.7 | 0 | 98.4 | 1.6 |
| | 200 | | 50.4 | 0 | 98.7 | 1.3 |
| | 280 | | 49.1 | 0 | 98.8 | 1.2 |
| Chromiumfree[2] | 42 | 150 | 48.2 | 1.3 | 97.2 | 1.5 |
| | 118 | | 47.2 | 1.9 | 95.4 | 2.7 |
| Chromiumfree[3] | 17 | 145 | 49.1 | 0 | 95.9 | 4.1 |
| | 100 | | 46.7 | 0.2 | 97.3 | 2.5 |
| | 200 | | 37.5 | 0.2 | 98.8 | 1.0 |
| | 300 | | 33.1 | 0 | 99.3 | 0.7 |

[1]LHSV 5.2
[2]$Cu_2Al_6B_4O_{17}$ made at final gel pH 7.5.
[3]$Cu_2Al_6B_4O_{17}$ made at final gel pH 9.5.

EXAMPLE 6

| Catalyst | Hrs. | Temp. | Conv. | Product Distribution | | |
|---|---|---|---|---|---|---|
| | | | | Propene | Acetone | Condens. Products |
| Example 1 | 30 | 245 | 50.4 | 3.1 | 58.2 | 38.7 |
| | 50 | | 45.5 | 2.2 | 68.9 | 28.9 |
| | 100 | | 48.3 | 0.5 | 61.1 | 38.4 |
| | 150 | | 45.8 | 0.4 | 66.3 | 33.3 |
| | 200 | | 46.3 | 0.3 | 73.7 | 26.0 |
| | 230 | | 44.8 | 0.3 | 73.8 | 25.9 |
| Chromiumfree[2] | 10 | 255 | 47.5 | 0.5 | 83.5 | 16.0 |
| | 30 | | 25.5 | 2.3 | 74.7 | 12.0 |
| | 50 | | 26.6 | 1.4 | 75.4 | 12.2 |
| | 80 | | 20.9 | 2.0 | 71.5 | 26.5 |
| Chromiumfree[3] | 20 | 260 | 49.4 | 0.5 | 84.6 | 14.9 |
| | 50 | | 42.5 | 1.3 | 91.0 | 7.7 |
| | 70 | | 39.2 | 1.8 | 91.3 | 6.9 |

[1]LHSV 5.2
[2]$Cu_2Al_6B_4O_{17}$ made at final gel pH 7.5.
[3]$Cu_2Al_6B_4O_{17}$ made at final gel pH 9.5.

EXAMPLE 7

| Temp. | WHSV | Conversion | Product Distribution ||||
|---|---|---|---|---|---|---|
| | | | Cyclo-hexanone | Cyclo-hexene | Phenol | Condens. Products |
| 165 | 1 | 18% | 100% | — | — | — |
| 185 | 1 | 30% | 98% | 1% | — | 1% |
| 205 | 1 | 55% | 85% | 8% | 1% | 6% |
| 205 | 2 | 39% | 99% | 1% | — | — |
| 225 | 1 | 63% | 89% | 7% | — | 4% |

[1]Example 1

What is claimed is:

1. An inorganic crystalline material comprising copper, chromium, aluminum, boron, and oxygen having an X-ray diffraction pattern comprising significant lines substantially as described in Table I.

2. The composition of claim 1 and a binder.

3. The composition of claim 1 comprising the crystalline material having a structure $$Cu_{2-X}Cr_yAl_{6-y}B_4O_{17}M_mM'_n$$

where M is a divalent metal, M' is a monovalent metal, m is a number in a range from 0 to 0.8, n is a number in a range from 0 to 1.6, X is a number in a range from 0 to 0.8 and is equal to the sum of m and n/2, and y is a number in a range from 0.01 to 3.

4. The crystalline material of claim 3 wherein X is a number in a range from 0.01 to 0.5.

5. The composition of claim 1 comprising the crystalline material having a structure $$Cu_{2-X}Cr_yAl_{6-y}B_4O_{17}M_X,$$

where M is a divalent metal selected from the group consisting of zinc, palladium, cobalt, and nickel, X is a number in a range from 0 to 0.8, and y is a number in a range from 0.01 to 3.

6. The crystalline material of claim 5 wherein X is a number in a range from 0.01 to 0.5.

7. The crystalline material of claim 6 wherein M is zinc.

8. The crystalline material of claim 6 wherein M is cobalt.

9. The crystalline material of claim 6 wherein M is nickel.

10. The crystalline material of claim 6 wherein M is palladium.

11. The composition of claim 1 comprising the crystalline material having a structure $$Cu_2Cr_yAl_{6-y}B_4O_{17}$$

where y is a number in a range from 0.01 to 3.

12. The crystalline material of claim 10 wherein y is a number in a range from 0.015 to 2.

13. The process of making the crystalline material of claim 1 which comprises dispersing in a liquid medium a source of copper(II) ion, a source of chromium(III) ion, a source of alumina, and a source of boria, removing substantially all the liquid from the mixture to form a superficially dry solid, and calcining the superficially dry solid at a temperature in a range from about 600° C. to about 1500° C.

14. The process of claim 13, wherein the molar ratio of the source of copper (II) ions to the source of boria, in terms of oxides calculated as $CuO/B_2O_3$, is about 0.2 to about 5, the molar ratio of the source of chromium (III) ions plus the source of alumina to the source of boria, in terms of oxides calculated as $(Cr_2O_3+Al_2O_3)/B_2O_3$, is about 0.03 to about 20, and the molar ratio of the source of alumina to the source of chromium (III) ions plus the source of alumina, in terms of oxides calculated as $Al_2O_3/(Cr_2O_3+Al_2O_3)$, is about 0.3 to about 20.

15. The process of claim 13, wherein the $CuO/B_2O_3$ molar ratio is about 0.5 to about 2, the $(Cr_2O_3+Al_2O_3)$ molar ratio is about 0.5 to about 6, the $Al_2O_3/(Cr_2O_3 30 Al_2O_3)$ molar ratio is about 0.5 to about 6, and the pH of the mixture is in a range from about 2 to about 10.

16. The process of making the crystalline material of claim 5, which comprises forming an aqueous composition comprising a source of copper(II) ions, a source of chromium(III) ions, a source of alumina, and a source of boria, at a pH in a range from about 3 to about 9, drying the composition to form a superficially dry solid, and calcining the dry solid at a temperature in a range from about 700° C. to about 1100° C. to form a calcined solid.

17. The process of making the crystalline material of claim 11, which comprises forming an aqueous composition comprising a source of copper (II) ions, a source of chromium (III) ions, a source of alumina, and a source of boria, at a pH in a range from about 3 to about 9, drying the composition to form a superficially dry solid, and calcining the dry solid at a temperature in a range from about 700° C. to about 1100° C. to form a calcined solid.

* * * * *